Dec. 3, 1968    D. Y. H. MUI ET AL    3,414,792
HIGH POTENTIAL PULSE TEST CIRCUIT FOR CAPACITORS
Filed June 23, 1965    2 Sheets-Sheet 1

INVENTORS
DAVID Y. H MUI
NORBERT SZASZ
BY *Smart & Biggar*
ATTORNEYS

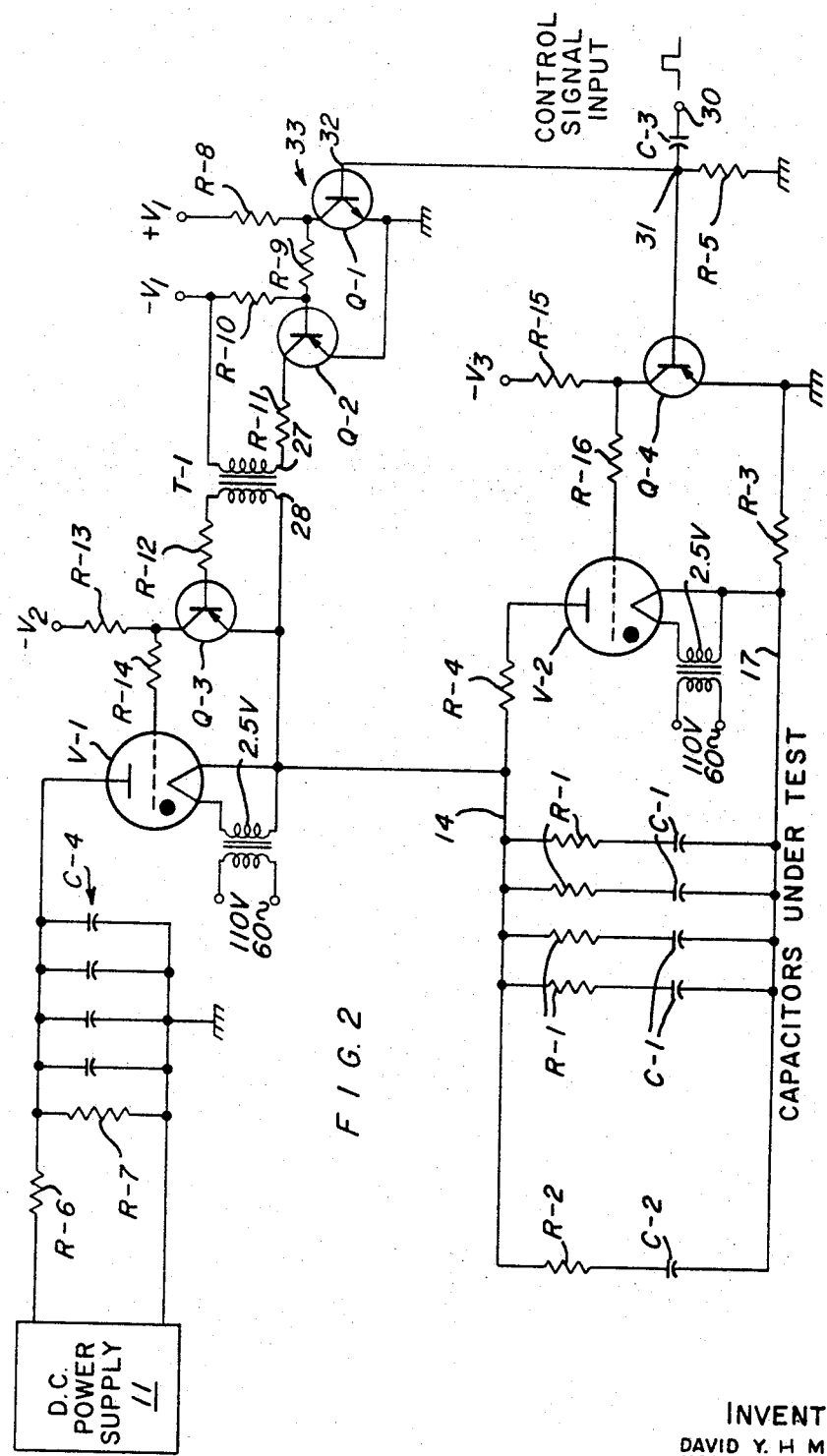
F I G. 2

United States Patent Office 3,414,792
Patented Dec. 3, 1968

3,414,792
HIGH POTENTIAL PULSE TEST CIRCUIT FOR CAPACITORS
David Y. H. Mui, Montreal, Quebec, and Norbert Szasz, Chateauguay Centre, Quebec, Canada, assignors to Northern Electric Company Limited, Montreal, Quebec, Canada
Filed June 23, 1965, Ser. No. 466,344
11 Claims. (Cl. 320—1)

ABSTRACT OF THE DISCLOSURE

An accelerated life testing circuit for capacitors which rapidly subjects test capacitors to a large number of charges and discharges. A first series circuit loop is closed by a control circuit to connect the test capacitors in series with a direct current voltage source. The control circuit then opens the first series circuit loop and closes a second series circuit loop which provides a discharge path for the capacitors. The control circuit alternately opens and closes the two series circuit loops so that the capacitors are alternately charged and discharged.

---

This invention relates to a high potential pulse test circuit for accelerated life testing of capacitors.

Manufacturers of communication equipment often require a life reliability test on the components they use. This is to ensure a high quality and reliability standard for their products. One of the most commonly-used life test procedures is the accelerated aging method. The accelerating factor and the test conditions employed are normally related to the actual operating conditions of the communication equipment components in the field.

To evaluate the quality of a particular type of capacitor, samples may be subjected to an accelerated life test. The test comprises rapidly charging and discharging the capacitors a predetermined minimum number of times by pulsing the capacitors with a signal having a predetermined amplitude, pulse duration, rise time and repetition rate. The values of the foregoing variables will depend on the particular type of capacitor being tested. For example, in the usual accelerated life test for a Northern Electric type 542P capacitor (0.05 microfarad), the signal preferably has a peak amplitude of 1100 volts, a pulse duration of 1 to 1.5 milliseconds, a rise time of 300 microseconds and a repetition rate of two pulses per second for at least 2,000,000 pulses. These capacitors are expected to meet the following limits after pulsing: (a) no failure out of 13 units after 2,000,000 pulses, (b) one failure out of 13 units after 2,500,000 pulses.

To provide the required high voltage and fast rise time for a capacitive load, an extremely high power pulse signal source would be needed, if conventional pulse sources were used. To avoid the need for a high power pulse signal source, the present invention instead makes use of a direct current power source which is periodically switched on and off across the capacitors under test.

The present invention accordingly provides a circuit for rapidly charging and discharging a plurality of capacitors to be tested by means of high amplitude pulses having a short rise time, which comprises a first series loop including the said D.C. power source, a first switching means and the capacitors to be tested; a second series loop including said capacitors and a second switching means; and control means connected to said first and second switching means, said control means repetitively effecting the following sequence of operations: actuating said first switching means to close said first loop while said second loop is open to thereby charge said capacitors and subsequently de-actuating said first switching means and actuating said second switching means to thereby open said first loop and close said second loop to discharge said capacitors.

Since the pulse-test circuit has a relatively short duty cycle, a suitable high current source may comprise a plurality of capacitors connected through current-limiting resistors across a low power D.C. supply.

Since said first and second switching means must be capable of turning on and off (a) precisely, at a very fast rate and (b) reliably, in a high potential and high current circuit, with a life expectancy of, for example, at least 2,500,000 operations, it is preferred to use a first and a second gas-filled thyratron tube for the first and second switching means respectively, although any other suitable switching means could be used. The control means preferably comprises a source of pulses of alternately first and second polarity and normally-open transistor switching means, actuated by a pulse of said first polarity, to apply a positive pulse to the control grid of said first thyratron to initiate conduction of said first thyratron to thereby charge said test capacitors and means, actuated by a pulse of said second polarity, to apply a positive pulse to the control grid of said second thyratron to initiate conduction of said second thyratron to thereby discharge said test capacitors.

The pulses of alternately first and second polarity may be produced by differentiating square wave pulses in which case pulses of one polarity are produced corresponding to the leading edges of the square-wave pulses and pulses of opposite polarity are produced corresponding to the trailing edges of the square-wave pulses.

The invention will now be further described in connection with the accompanying drawings, in which:

FIGURE 2 is a schematic diagram of a circuit according to the invention; and

Figure 1:
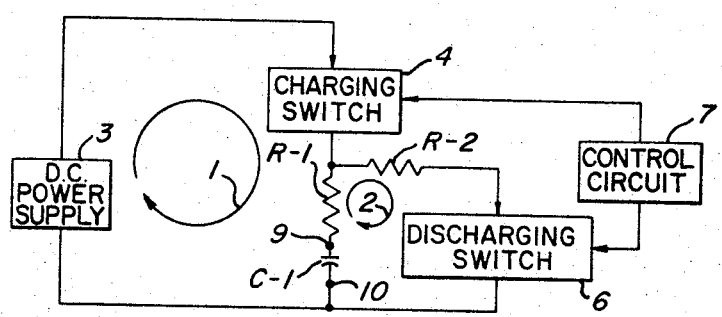
FIGURE 1 is a block diagram of a test circuit according to the invention.

Referring to FIGURE 1, a circuit according to the invention is seen to comprise: a first series loop 1 having, in series: a pair of terminals 9 and 10 for connection to a capacitor C–1 to be tested, a direct current source 3, a charging switch 4 and a resistor R–1; a second series loop having, in series: said pair of terminals 9 and 10, resistor R–1, resistor R–2 and discharging switch 6; and a control circuit 7 connected to the charging switch 4 and the discharging switch 6.

When charging switch 4 is closed, the test capacitor C–1 charges through charging switch 4 and resistor R–1 to the value of the supply voltage. Series resistor R–1 controls the charging time constant to give a predetermined rise time for the waveform of the charging current.

At the end of a predetermined time interval, the control circuit 7 opens the charging switch 4. After the charging switch opens, the control circuit closes the discharging switch 6 and the capacitor C–1 discharges through resistors R–1 and R–2 and the discharging switch 6. When the capacitor C–1 is completely discharged, the control circuit 7 opens the discharging switch 6 and thus completes a test cycle.

FIGURE 2 shows a schematic diagram of a circuit according to the present invention. The direct current source comprises a bank of capacitors, generally indicated at C–4, connected across a D.C. power supply 11 and having current limiting resistors R–6 and R–7. Four capacitors C–4 are shown by way of illustration, it being understood that the number will be chosen to meet the current requirements of the circuit. The direct current source is connected to the plate of thyratron V–1, the cathode of which is connected to lead 14. A plurality of resistor-capacitor combinations R-1, C-1 are connected between lead 14 and a lead 17 which is connected to ground through resistor R-3. Lead 14 is connected through resistor R-4 to the plate of thyratron V-2, the cathode of which is connected to lead 17.

The capacitors C-1 are the capacitors under test. Four are shown by way of example, it being understood that the number may vary.

Thyratron V-1 comprises a charging switch and thyratron V-2 comprises a discharging switch for capacitors C-1. The two thyratrons are normally reverse biased and the firing sequence of the two thyratrons is governed by the control circuit to be described subsequently.

When thyratron V-1 fires, the capacitors C-1 under test start to charge. The charging current develops a voltage across resistor R-3 in the charging loop which provides an additional reverse bias for thyratron V-2. This reverse bias prevents thyratron V-2 from misfiring during the charging cycle. The correct charging time constant is obtained by selection of a fixed series resistor R-1 for each capacitor under test. Network R-2, C-2 is connected in parallel with the load. This network has a longer time constant than the units under test and is used to control the cut-off point for the two thyratrons. When the capacitors under test become fully charged, capacitor C-2 is still in the charging stage. This charging current keeps thyratron V-1 in the conducting condition for a period equal to the test-pulse width requirement. This is quite important because thyratron V-1 must be conducting in order to keep the voltage source effectively connected across the capacitors. The test condition would be entirely different if the capacitors were disconected from the power source and left in the charged condition during the pulse-on period. Near the end of the time of the required test pulse width, capacitor C-2 approaches a fully charged condition. This causes the charging current to diminish and thus extinguish thyratron V-1. After thyratron V-1 is cut-off, thyratron V-2 is turned on by the control circuit. Capacitors C-1 and C-2 then discharge through thyratron V-2 and series resistor R-4. Due to the longer time constant of network R-2, C-2, thyratron V-2 is kept in the conducting state while the capacitors under test discharge completely. As capacitor C-2 approaches complete discharge, the discharging current decreases and thus causes thyratron V-2 to extinguish. This charge and discharge cycle is repeated at a predetermined rate which is governed by the control circuit. The time constant of the R-2, C-2 network may be much larger than the time constant of the units under test, for example, six times larger when the circuit is used to test the Northern Electric type 542P capacitor, where the test requirement on the pulse duration is 1.5 milliseconds and on the pulse rise time is 300 microseconds. However, it must be small enough to allow capacitor C-2 to charge sufficiently during the charging portion of the test to cut-off thyratron V-1 before the control circuit turns on thyratron V-2. Since the pulse duration is much less than the pulse repetition rate, capacitor C-2 has a relatively long time to discharge and cut-off conduction of thyratron V-2 during the discharge portion of the test before the control circuit again triggers thyratron V-1 into conduction. Thus the maximum time constant for the R-2, C-2 network is determined by the charging portion of the test cycle.

Basically, the circuit would work equally well with the R-2, C-2 network time constant *slightly* greater or *much* larger than the time constant of the units under test. The determinating factor is on the test pulse width requirement only (T2 on FIGURE 3). For example, if the required pulse width is equal to five times the time constant of the units under test, then the R-2, C-2 network time constant should be about six times larger, i.e., R-2, C-2 network time constant≈time constant of units under test+test pulse width requirement.

In other words, depending on the test pulse width requirement, the time constant for the R-2, C-2 network may be a few or many times larger than the time constant of the unit under test. However, the R-2, C-2 network time constant must be slightly smaller than the time difference between the firing of thyratrons V-1 and V-2, so that V-1 can have sufficient time to cut-off before V-2 is turned on by the control circuit. Thus, any change in the R-2, C-2 network time constant must be compensated with an equal change on the time difference between the firing of thyratrons V-1 and V-2.

Figure 3:
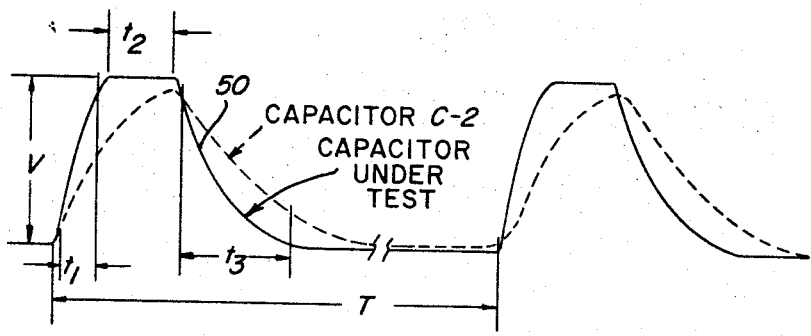
FIGURE 3 illustrates waveforms of the voltages appearing across components in the circuit of FIGURE 2.

The voltage waveform, as observed across capacitor C-2 and the capacitors under test, is shown in FIGURE 3 where V is the test voltage, $T_1$ is the rise time of the voltage pulse 50, $T_2$ is the test pulse width, $T_3$ is the decay time of pulse 50 and T is the time between pulses.

The pulses of alternately first and second polarity are coupled to input terminal 31 of the control circuit. The control circuit includes two PNP transistors Q-3 and Q-4 which are normally biased to cut-off. Input terminal 31 is connected to the input of transistor Q-4 and to the input of a two-stage amplifier generally indicated at 33, the output of which is coupled through transformer T-1 to the input of transistor Q-3.

Amplifier 33 includes an NPN transistor Q-1 and a PNP transistor Q-2. The emitters of transistors Q-1 and Q-2 are connected together and to ground. The collector of transistor Q-1 is conected through resistor R-8 to a source of voltage $+V_1$ and through resistor R-9 to the base of PNP transistor Q-2. The junction of resistor R-9 with the base of transistor Q-2 is connected through a resistor R-10 to a source of voltage $-V_1$. The collector of transistor Q-2 is connected through resistor R-11 to the primary winding 27 of transformer T-1 to a source of voltage $-V_1$. The secondary winding 28 of transformer T-1 is coupled to the emitter of transistor Q-3 and, through a resistor R-12, to the base of transistor Q-3.

The collector of transistor Q-3 is connected through resistor R-13 to a source of voltage $-V_2$ and through resistor R-14 to the control grid of thyratron V-1. The emitter of transistor Q-3 is connected to the cathode of thyratron V-1.

The emitter of transistor Q-4 is connected to ground and, through a resistor R-3, to the cathode of thyratron V-2. The collector of transistor Q-4 is connected through resistor R-15 to voltage source $-V_3$ and through resistor R-16 to the control grid of thyratron V-2.

As stated previously, pulses of alternately first and second polarity are coupled to the input terminal 31 of the control circuit. A positive pulse applied to input terminal 31 has little effect on PNP transistor Q-4 except to drive it further into cut-off. However, the positive pulse is also fed to the input of the two-stage amplifier 33 and the output signal from transistor Q-2 is coupled through transformer T-1 and applied as a negative signal to the base of transistor Q-3. Transistor Q-3 operates as a normally open switch across the grid and cathode of thyratron V-1. When the negative signal appears at the base of transistor Q-3, transistor Q-3 is driven into saturation, momentarily effectively shorting the grid of thyratron V-1 to its cathode. As the grid bias of thyratron V-1 swings from $-V_2$ volts to zero, the thyratron V-1 fires.

On the other hand, a negative pulse applied to input terminal 31 has little effect on transistor Q-3 since transistor Q-1 is driven further into cut-off whereas it saturates PNP transistor Q-4, which also operates as a normally-open switch, and thus causes a positive swing on the grid bias of thyratron V-2. Thyratron V-2 fires as its grid changes rapidly from $-V_3$ volts to zero.

Pulses of alternately positive and negative polarity may conveniently be produced by differentiating square wave pulses. Thus in FIGURE 2 a differentiating circuit having an input terminal 30 and comprising capacitor C-3 and resistor R-5 is shown connected to the input terminal 31 of the control circuit. If a positive square wave pulse is supplied to the input terminal 30 of the differentiating circuit, a positive pulse followed by a negative pulse, corresponding to the leading and trailing edges respectively of the square wave pulse, is applied to the input terminal 31 of the control circuit.

The time difference between the firing of thyratrons V–1 and V–2 then depends on the pulse width of the square-wave control signal. The duration time of the test pulse can be changed simply by varying the pulse width of the control signal and the time constant of the R–2, C–2 network. The operating cycle is determined solely by the repetition rate of the control signal.

The number of capacitors that can be tested in parallel with this circuit is limited only by the power rating of the thyratron tubes and the D.C. power source. However, the value of resistor R–3 must be reduced if more capacitors are added to the load. This is to avoid firing a thyratron V–2 while thyratron V–1 is still in the conducting state.

As stated previously, for a Northern Electric type 542P capacitor (0.05 microfarad) the signal preferably has a peak amplitude of 1100 volts, a pulse duration of 1 to 1.5 milliseconds, a rise time of 300 microseconds and a repetition rate of 2 pulses per second for 2,000,000 pulses. Circuit values used in a successful embodiment of a circuit providing the above signal are as follows:

| | |
|---|---|
| D.C. power supply 11 | 1100 volts, 40 milliamps. |
| Thyratrons V–1 and V–2 | Type P1–3C23. |
| Transistor Q–1 | TS87. |
| Transistors Q–2 and Q–4 | 12F. |
| Transistor Q–3 | 2N1132. |
| Resistor R–1 | 1,000 ohms. |
| Resistors R–6, and R–10 and R–5 | 10,000 ohms. |
| Resistor R–7 | 4,400,000 ohms. |
| Resistors R–13, R–8 and R–15 | 4,700 ohms. |
| Resistors R–14 and R–16 | 47,000 ohms. |
| Resistors R–12 and R–2 | 3,300 ohms. |
| Resistor R–11 | 100 ohms. |
| Resistors R–9 and R–4 | 2,200 ohms. |
| Resistor R–3 | 50 ohms. |
| Capacitor C–1 | 0.05 microfarad. |
| Capacitor C–2 | 0.1 microfarad, 3000 volts. |
| Capacitor C–3 | 0.1 microfarad. |
| Capacitors in bank C–4 | 20 microfarads, 1200 volts D.C. (20 Northern Electric Type 287–C capacitors). |
| Voltage source $V_1$ | ±30 volts. |
| Voltage source $V_2$ | –45 volts. |
| Voltage source $-V_3$ | –35 volts. |

A Nagard type 5002 pulse generator providing two pulses per second was connected to the input terminal 30 of the differentiating circuit.

This circuit is capable of simultaneously testing fifty Northern Electric type 542P capacitors (0.05 microfarad each).

We claim:

1. A pulse test circuit for capacitors comprising: a first series loop including a direct current source, a first switching means and said capacitors, each of said capacitors being connected in series with a resistor to form resistor-capacitor combinations each having a predetermined time constant, said resistor-capacitor combinations being all connected in parallel and in parallel with a further resistor-capacitor combination having a time constant greater than said predetermined time constant; a second series loop including said resistor-capacitor combinations and a second switching means; and control means connected to said first and second switching means, said control means repetitively effecting the following sequence of operations: actuating said first switching means to close said first loop while said second loop is open to thereby charge said capacitors and subsequently deactuating said first switching means and actuating said second switching means to thereby open said first loop and close said second loop to discharge said capacitors.

2. A pulse-test circuit as claimed in claim 1 wherein said direct current source comprises a plurality of capacitors connected across a D.C. power supply.

3. A pulse test circuit as claimed in claim 1 wherein said first and second switching means comprise first and second thyratrons.

4. A pulse test circuit as claimed in claim 3 wherein said first and second thyratrons each have a control grid and said control means actuates each said thyratron by applying a positive pulse to its control grid to thereby initiate conduction through the thyratron.

5. A pulse test circuit as claimed in claim 4 wherein said further resistor-capacitor combination maintains conduction through said first thyratron for a predetermined interval after said capacitors to be tested are substantially fully charged and through said second thyratron for a period of time longer than that required to substantially discharge said capacitors to be tested.

6. A pulse test circuit as claimed in claim 5 wherein said further resistor-capacitor combination has a time constant of the order of six times the time constant of each said resistor-capacitor combinations.

7. A pulse test circuit as claimed in claim 4 wherein said control means includes a source of pulses of alternately first and second polarity, means responsive to pulses of said first polarity for applying a positive pulse to the control grid of said first thyratron to initiate conduction of said first thyratron, and means responsive to pulses of said second polarity for applying a positive pulse to the control grid of said second thyratron to initiate conduction of said second thyratron.

8. A pulse test circuit as claimed in claim 7 wherein the source of pulses of alternately first and second polarity comprises a source of square wave pulses having an output connected to a differentiating circuit, said differentiating circuit producing pulses of alternately first and second polarity corresponding to the leading and trailing edges respectively of said square wave pulses.

9. A pulse test circuit as claimed in claim 7 wherein the means responsive to pulses of said first polarity and the means responsive to pulses of said second polarity each comprise normally-open electronic switching means.

10. A pulse-test circuit as claimed in claim 7 wherein the means responsive to said pulses of said first polarity and the means responsive to said pulses of said second polarity each comprise normally-open transistor switching means.

11. A pulse-test circuit as claimed in claim 7 wherein the means responsive to said pulses of said first polarity comprises normally-open transistor switching means and wherein means are provided for amplifying said pulses of said first polarity and applying the resulting amplified pulses to said switching means.

References Cited

UNITED STATES PATENTS

| | | | |
|---|---|---|---|
| 2,455,543 | 12/1948 | Williams | 324—60 |
| 2,470,895 | 5/1949 | Marlowe et al. | 320—1 |

BERNARD KONICK, *Primary Examiner.*

J. F. BREIMAYER, *Assistant Examiner.*